(12) United States Patent
Sato et al.

(10) Patent No.: US 8,360,468 B2
(45) Date of Patent: Jan. 29, 2013

(54) HEAD-PROTECTING AIRBAG APPARATUS

(75) Inventors: Jun Sato, Kiyosu (JP); Ryosuke Jinnai, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/369,396

(22) Filed: Feb. 9, 2012

(65) Prior Publication Data

US 2012/0248749 A1    Oct. 4, 2012

(30) Foreign Application Priority Data

Mar. 30, 2011   (JP) ................................. 2011-075077

(51) Int. Cl.
*B60R 21/16*      (2006.01)
(52) U.S. Cl. .................................................. 280/730.2
(58) Field of Classification Search ............... 280/730.2, 280/743.1, 741, 742
See application file for complete search history.

(56) References Cited

U.S. PATENT DOCUMENTS

| 7,744,121 B2 * | 6/2010 | Ishikawa et al. ........... 280/730.2 |
| 7,766,378 B2 * | 8/2010 | Miura et al. ............... 280/730.2 |
| 2009/0236829 A1 | 9/2009 | Tanaka et al. |
| 2010/0225097 A1 * | 9/2010 | Trovato et al. ............. 280/730.2 |
| 2011/0101658 A1 * | 5/2011 | Konishi et al. ............. 280/730.2 |

FOREIGN PATENT DOCUMENTS

| JP | A-2001-088651 | 4/2001 |
| JP | A-2009-227161 | 10/2009 |
| JP | A-2011-001042 | 1/2011 |

\* cited by examiner

*Primary Examiner* — Faye M. Fleming
(74) *Attorney, Agent, or Firm* — Posz Law Group, PLC (57) ABSTRACT

A head-protecting airbag apparatus covers a window so that an occupant's head can be protected. The airbag includes a front window shielding portion with an inclining inflatable portion and a horizontal inflatable portion in the shape of a pipe. The inclining inflatable portion is disposed between an upper guide portion that extends continuously from a portion that partitions an upper edge region of the gas supply passage, and a lower guide portion that extends from a portion that partitions a lower edge region of the gas supply passage. The inclining inflatable portion and the horizontal inflatable portion respectively include an inclining peak portion and a horizontal peak portion formed by ridgelines that swell thickly. The respective width dimensions of the inclining inflatable portion and the horizontal inflatable portion in a flat state are larger than the vertical width dimension of the gas supply passage that is flatly deployed.

5 Claims, 7 Drawing Sheets

HEAD-PROTECTING AIRBAG APPARATUS

The present application claims priority from Japanese Patent Application No. 2011-75077 of Sato et al., filed on Mar. 30, 2011, the disclosures of which is hereby incorporated into the present application by reference.

BACKGROUND OF THE INVENTION

1. Field of the Invention

The present invention relates to a head protecting airbag apparatus that is mounted on a vehicle, and inflates an airbag that protects the head of an occupant upon the lateral collision of the vehicle. An airbag deploys and inflates downward from a region at an upper edge of a window of a vehicle so as to cover the interior of the window. Particularly, in the invention, the airbag includes a front window shielding inflatable portion for protecting the head of an occupant who has sit down on a front seat.

2. Background Art

In the related art, in a head protecting airbag apparatus, as described in JP-A-2011-1042, the airbag deploys and inflates downward from a region at an upper edge of a window of vehicle so as to cover the interior of the window upon the inflow of inflation gas. This airbag is folded and housed at the upper edge of the window so that a lower edge of the airbag in a flatly deployed state approaches an upper edge thereof. Additionally, this airbag includes a gas inflow portion and a gas non-inflow portion. The gas inflow portion swells so as to allow inflation gas to flow thereinto and separate an interior wall portion and an exterior wall portion. The gas non-inflow portion is configured to couple the interior wall portion and the exterior wall portion together, and inhibits inflation gas from flowing thereinto.

The gas inflow portion includes a window shielding inflatable portion, a gas supply passage, and a joint port. The window shielding inflatable portion protects the head of an occupant who has sit down, and includes a front window shielding inflatable portion and a rear window shielding inflatable portion. The front window shielding inflatable portion deploys and inflates so as to cover a window at a front seat so as to be able to protect the head of an occupant who has sit down on the front seat of a vehicle. The rear window shielding inflatable portion deploys and inflates so as to cover a window at a rear seat so as to be able to protect the head of an occupant who has sit down on the rear seat of the vehicle. The gas supply passage is arranged along a longitudinal direction at the upper edge of the airbag, and allows both longitudinal ends thereof to communicate with upper ends of the front window shielding inflatable portion and the rear window shielding inflatable portion. The gas supply passage communicates with a tubular joint port that extends upward at the upper edge of the airbag. An inflator that supplies inflation gas is connected to the joint port.

The gas non-flow portion includes a peripheral edge portion that surrounds the gas inflow portion, and a closing portion that extends from the peripheral edge portion and partitions the window shielding inflatable portion.

In the airbag of the related art, a circular closing portion is disposed in the region of the front window shielding inflatable portion. This closing portion is located in front of the gas supply passage, and is disposed so as to be separated from the upper edge of the peripheral edge portion and enter the region of the front window shielding inflatable portion.

Additionally, in the head protecting airbag apparatus of the related art, as shown in JP-A-2001-88651, the airbag is configured so that forwardly descending linear closing portions are vertically juxtaposed in the region of the front window shielding inflatable portion. In this airbag, the inflation gas from the inflator can be rapidly supplied toward the front edge of the front window shielding inflatable portion by the upper and down linear closing portions.

However, in the airbag of the former airbag apparatus, the circular closing portion is disposed apart from the periphery in front of the gas supply passage. Therefore, when the inflation gas from the inflator enters the front window shielding inflation through the gas supply passage, the inflation gas hits the circular closing portion and the inflation gas are branched up and down. As a result, in the former airbag apparatus, the front window shielding inflatable portion is hard to deploy and inflate downward rapidly.

Additionally, in the airbag of the latter airbag apparatus, upon the inflow of inflation gas, the inflation gas is directed to a vertical intermediate portion at a front edge of the front window shielding inflatable portion by the two upper and lower closing portions that extend in a forward downward direction. Therefore, the front window shielding inflatable portion is apt to deploy and inflate downward. However, the two upper and lower closing portions are disposed at the vertical intermediate portion in the region of the front window shielding inflatable portion so as to extend in an oblique direction in the longitudinal direction. These two closing portions are gas non-flow portions that do not swell. Therefore, in this airbag, there is a problem with receiving the head of an occupant at a front seat with sufficient cushioning properties. That is, if the heights of heads are different due to a difference between the physiques of occupants who sit down at a front seat, there is a concern that the center of gravity of a head is disposed at the position of a closing portion with low cushioning properties, which is not preferable.

SUMMARY OF THE INVENTION

The invention solves the above-described problems, and an object thereof is to provide a head protecting airbag apparatus that can quickly perform deployment and inflation to a lower edge of a front window shielding inflatable portion, and suitably receive and protect the heads of occupants that have different physiques.

The head protecting airbag apparatus related to the invention includes an airbag and an inflator that supplies inflation gas to the airbag. The airbag deploys and inflates downward from a region at an upper edge of a window of a vehicle so as to cover the interior of the window upon the inflow of inflation gas in order to protect the head of an occupant. Additionally, the airbag is folded and housed at the upper edge of the window so that a lower edge of the airbag in a flatly deployed state approaches an upper edge thereof. The vehicle includes a plurality of windows juxtaposed in a longitudinal direction, including a front window at a side of a front seat.

The airbag includes a gas inflow portion and a gas non-inflow portion. The gas inflow portion swells so as to allow inflation gas to flow thereinto and separate an interior wall portion and an exterior wall portion. The gas non-inflow portion is configured to couple the interior wall portion and the exterior wall portion together, and inhibits inflation gas from flowing thereinto. Additionally, the gas non-flow portion has a peripheral edge portion surrounding the gas inflow portion. The gas inflow portion includes a plurality of window shielding inflatable portions and a gas supply passage. The window shielding inflatable portion deploys and inflates so as to cover a plurality of windows juxtaposed in the longitudinal direction, and has a front window shielding inflatable portion that covers the front window. The gas supply passage is arranged along the longitudinal direction at the upper edge of the airbag. The gas supply passage allows a front end thereof to communicate with the front window shielding inflatable portion, and supplies the inflation gas from the inflator to the front window shielding inflatable portion.

The front window shielding inflatable portion is disposed at a rear end upper portion thereof an inflow port that communicates with a front end of the gas supply passage to allow inflation gas to flow thereinto from the gas supply passage. Additionally, the front window shielding inflatable portion is configured so that the gas non-flow portion is not disposed in the region of the front window shielding inflatable portion. Moreover, the front window shielding inflatable portion is configured by disposing an inclining inflatable portion and a horizontal inflatable portion that inflates in the shape of a pipe upon the completion of inflation. The inclining inflatable portion inflate in the shape of a pipe so as to extend in an obliquely forward and downward direction from the inflow port upon the completion of inflation, and an inclining peak portion that extends in an obliquely forward and downward direction from the inflow port is disposed as a peak portion of which the thickness in a vehicle width direction is made large. The horizontal inflatable portion inflates in the shape of a pipe that extends forward along the lower edge of the airbag while being adjacent to a lower edge portion of the peripheral edge portion in the lower edge of the airbag from a lower end of the inclining inflatable portion upon the completion of inflation, and the horizontal peak portion that extends forward from a lower end of the inclining peak portion is disposed as a peak portion of which the thickness in the vehicle width direction is made large.

The gas non-flow portion includes an upper guide portion and a lower guide portion. The upper guide portion is arranged at an upper edge of the inclining inflatable portion, and extends in an obliquely forward and downward direction continuously from the portion of the gas non-flow portion that partitions a region at an upper edge of the gas supply passage. The lower guide portion is arranged at a lower edge of the inclining inflatable portion, and extends in an obliquely forward and downward direction from the portion of the gas non-flow portion that partitions a region at a lower edge of the gas supply passage. The inclining inflatable portion is disposed between the upper guide portion and the lower guide portion.

The respective width dimensions of the inclining inflatable portion and the horizontal inflatable portion in a direction orthogonal to the respective inclining peak portion and horizontal peak portion that are flatly deployed are larger than the vertical width dimension of the gas supply passage that is flatly deployed.

In the head protecting airbag apparatus related to the invention, if the inflation gas from the inflator flows into the airbag, the inflation gas flow into the respective window shielding inflatable portions through the gas supply passage. In that case, in the front window shielding inflatable portion, inflation gas flows into the inclining inflatable portion from the inflow port of the front end of the gas supply passage, flows into the horizontal inflatable portion from the inclining inflatable portion, and reaches the front edge of the horizontal inflatable portion.

This front window shielding inflatable portion includes the inclining inflatable portion and the horizontal inflatable portion that communicate with each other, and the gas non-flow portion that is disposed to separate from the periphery is not disposed in the region of the front window shielding inflatable portion. The inclining inflatable portion is formed between the lower edge of the upper guide portion and the upper edge of the lower guide portion. Therefore, in the inclining inflatable portion, the inflation gas that flows in so as to be directed forward from the gas supply passage can be received at the lower edge of the upper guide portion that continues from the upper edge of the gas supply passage, and can be allowed to flow to the horizontal inflatable portion between the upper guide portion and the lower guide portion while being smoothly changed obliquely downward.

That is, in the airbag, the inflation gas supplied from the gas supply passage flows with a reduction in flow velocity being extremely suppressed without being branched, at the portion of the gas non-flow portion, and flows from a rear upper edge to an obliquely downward front lower edge, so that the lower edge of the airbag including the region at the front edge of the airbag can be deployed. Therefore, the whole region of the airbag at the front portion of the airbag can be rapidly deployed.

Moreover, if the inflation of the inclining inflatable portion itself is completed, the inclining peak portion that is located on the centerline of the inclining inflatable portion seen from the interior, and swells more thickly in the vehicle width direction than the gas supply passage can be formed immediately. Therefore, in the front window shielding inflatable portion, the head of an occupant at a front seat can be received with sufficient cushioning properties by the inclining peak portion. Of course, upon the completion of inflation of the inclining inflatable portion, the horizontal inflatable portion also inflates, and the horizontal peak portion that swells more thickly than the gas supply passage is formed in the front window shielding inflatable portion similarly to the inclining peak portion. Therefore, in the front window shielding inflatable portion, the head of an occupant at a front seat can be received with sufficient cushioning properties even by the horizontal peak portion.

The head of a big-bodied occupant is apt to be disposed at the upper portion and rear portion of the front window shielding inflatable portion. In that case, in the airbag of the head protecting airbag apparatus of the invention, it is possible to receive the head of the big-bodied occupant with sufficient cushioning properties by the inclining peak portion of the inclining inflatable portion.

Additionally, the head of a small-bodied occupant is apt to be arranged at the lower portion and front portion of the front window shielding inflatable portion. In that case, in the airbag of the head protecting airbag apparatus of the invention, it is possible to receive the head of the small-bodied occupant with sufficient cushioning properties by the horizontal peak portion of the horizontal inflatable portion.

Accordingly, in the head protecting airbag apparatus of the invention, the airbag can quickly perform deployment and inflation to the lower edge of the front window shielding inflatable portion, and suitably receive and protect the heads of occupants that have different physiques.

Additionally, in the head protecting airbag apparatus related to the invention, it is desirable that the airbag is configured so that, upon the completion of inflation, an upper end of the inclining peak portion of the inclining inflatable portion is arranged in the vicinity of a rear upper corner in the region of the front window and a lower edge of the horizontal inflatable portion is arranged in the vicinity of the height of the lower edge of the window at the front seat.

In such a configuration, when a big-bodied occupant makes a front seat slide back and sits down with his/her head arranged in the vicinity of a pillar on the rear side of the window, the head of the big-bodied occupant can be suitably received by a region at the upper portion of the inclining peak portion of the inclining inflatable portion where the airbag has swelled thickly. Additionally, in the above configuration, when a small-bodied occupant makes a front seat slide forward and sits down with his/her head arranged in the vicinity of the lower edge of the window, the head of the small-bodied occupant can be suitably received by a region at the front portion of the horizontal peak portion of the horizontal inflatable portion where the airbag has swelled thickly.

Moreover, in the head protecting airbag apparatus related to the invention, the respective width dimensions of the inclining inflatable portion and the horizontal inflatable portion in a direction orthogonal to the respective inclining peak portion and horizontal peak portion that are flatly deployed are made approximately equal to each other. Additionally, it is desirable that the inclining inflatable portion of the airbag is arranged so that, with the airbag being flatly deployed, the inclination angle of the inclining peak portion with the lower edge that extends in the longitudinal direction of the airbag is set to about 45° and the downward extension line of the lower edge of the upper guide portion intersects the vicinity of the corner portion of the front lower corner in the horizontal inflatable portion.

In such a configuration, the inclining inflatable portion can make the inflation gas directed forward from the gas supply passage flow in an obliquely downward direction of about 45° and linearly toward the corner portion of the front lower corner of the horizontal inflatable portion, at the upper edge partitioned by the upper guide portion. At the front portion of the airbag, the whole region at the lower edge can deploy and simultaneously swell up to the front edge. As a result, in the above configuration, deployment and inflation of the front window shielding inflatable portion can be performed as rapidly as possible.

Additionally, in the above configuration, the inclining inflatable portion and the horizontal inflatable portion are made thicker than the gas supply passage, and swell in the shape of a pipe with almost the same diameter, and the vicinity of the intersecting portion between the horizontal peak portion and the inclining peak portion is arranged in the vicinity of a longitudinal intermediate portion of the front window shielding inflatable portion. Therefore, even if the head of an occupant shifts to the front side or shifts to the upper side in the vicinity of the intersecting portion, the head can be smoothly received by any of the horizontal peak portion and inclining peak portion. As a result, in the above configuration, the head of an average middle-bodied occupant can be suitably received over a wide range in the vicinity of the intersecting portion.

Moreover, in the head protecting airbag apparatus related to the invention, the gas inflow portion of the airbag includes a pressure-adjusting chamber capable of being inflated by allowing inflation gas to flow thereinto from the front window shielding inflatable portion so as to be able to suppress a rise in the internal pressure of the front window shielding inflatable portion. This pressure-adjusting chamber is configured so that a narrowed opening for allowing inflation gas to flow thereinto from the front window shielding inflatable portion is arranged in the vicinity of the intersecting portion with the inclining inflatable portion at the lower edge of the rear end of the horizontal inflatable portion, and is disposed in an area ranging from the lower side of the front end of the gas supply passage in the airbag to the lower side of the inclining inflatable portion.

In such a configuration, when the inflated front window shielding inflatable portion receives the head of an occupant and raises the internal pressure abruptly, the inflation gas flows to the pressure-adjusting chamber via the opening. Therefore, in such a configuration, upon an abrupt rise in internal pressure, the value of the internal pressure of the front window shielding inflatable portion can be reduced, and an occupant head can be received and protected with sufficient cushioning properties.

Additionally, in the pressure-adjusting chamber, the opening that allows inflation gas to flow thereinto is arranged in the vicinity of the intersecting portion with the inclining inflatable portion at the lower edge of the rear end of the horizontal inflatable portion. Therefore, since the inflation gas is apt to flow toward the front end of the horizontal inflatable portion in the vicinity of the intersecting portion in an early stage of inflation of the airbag, the inflation gas is hard to flow into the pressure-adjusting chamber via the opening. As a result, in the middle of inflation of the airbag, the inflation gas is hard to flow to the pressure-adjusting chamber, and does not hinder the rapid completion of inflation of the front window shielding inflatable portion.

Moreover, in the head protecting airbag apparatus related to the invention, the vehicle includes a front pillar in front of the front window and a garnish that covers the interior of the front pillar, and when a front end portion of the airbag is configured to be housed at the exterior of the garnish, it is desirable to adopt the following configuration. That is, the gas inflow portion of the airbag includes a push-open inflatable portion located above the horizontal inflatable portion. This push-open inflatable portion has a communication port, which communicates with the horizontal inflatable portion to allow inflation gas to flow thereinto from the horizontal inflatable portion, disposed at the upper edge of the front end of the horizontal inflatable portion. The push-open inflatable portion pushes the garnish open by the inflow of inflation gas from the horizontal inflatable portion that has passed through the communication port.

In such a configuration, when inflation gas is allowed to flow in and the front window shielding inflatable portion inflates, the inflation gas also flows to the push-open inflatable portion via the communication port. When the push-open inflatable portion inflates, since the garnish that covers the interior of the front pillar is pushed open, the front end portion of the airbag can be smoothly deployed downward from the front pillar that is the housing portion.

DETAILED DESCRIPTION OF THE PREFERRED EMBODIMENTS

A preferred embodiment of the present invention is described below with reference to the accompanying drawings. However, the invention is not limited to the embodiment disclosed herein. All modifications within the appended claims and equivalents relative thereto are intended to be encompassed in the scope of the claims.

Figure 1:
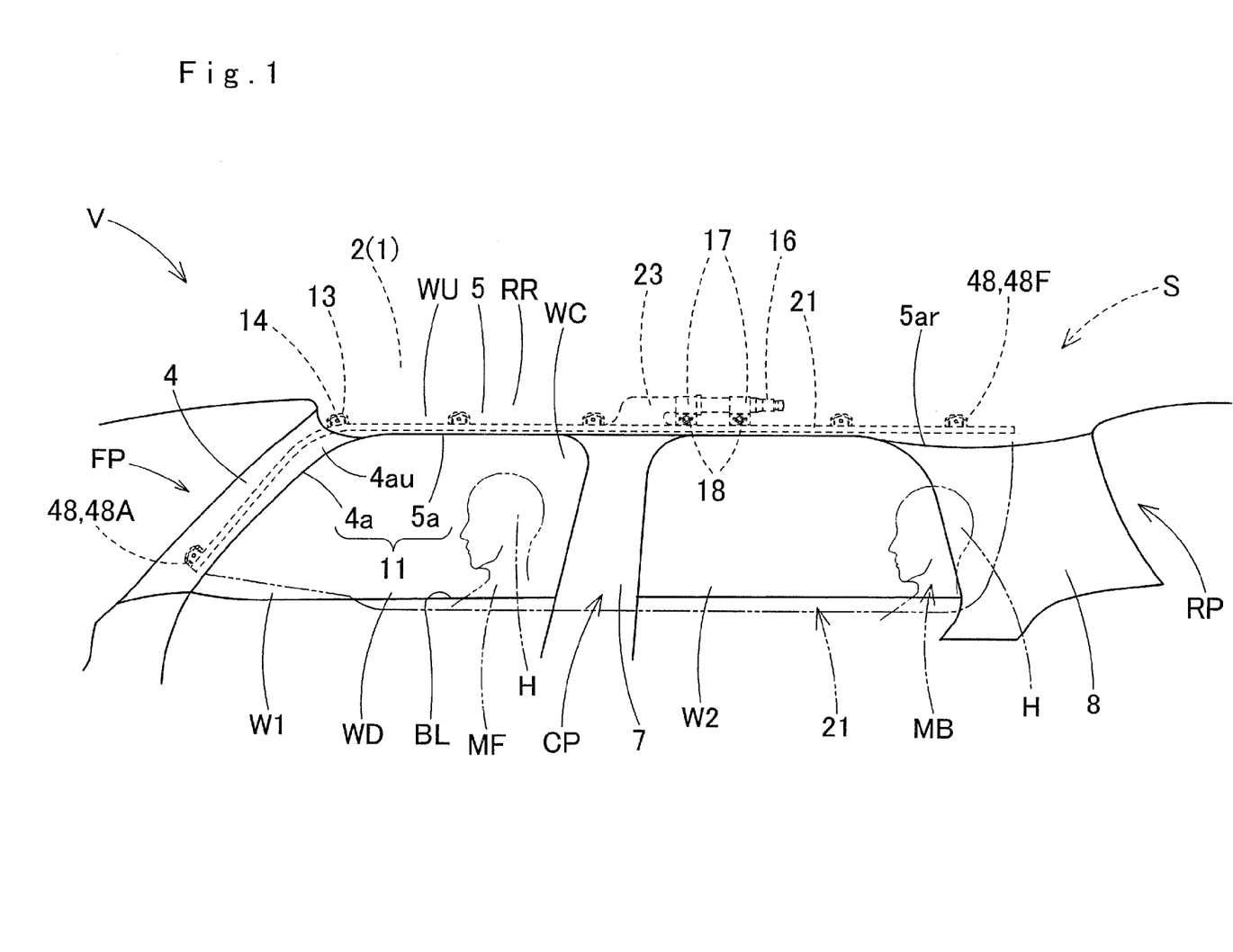
FIG. 1 is a front view when a head-protecting airbag apparatus of the embodiment of the invention is seen from the interior.

A head-protecting airbag apparatus S of an embodiment, as shown in FIG. 1, includes an airbag 21, an inflator 16, an airbag cover 11, and a plurality of mounting brackets 13. The airbag 21 is folded and housed in a range from a region at a lower edge of a front pillar FP via the upper side of a center pillar CP to the upper side of a rear pillar RP, at upper edges WU of windows (side windows) W1 and W2 at sides of a front seat and a rear seat inside a vehicle V.

As shown in FIG. 1, the inflator 16, which is of a substantially columnar type, is inserted into a joint port 23 of the airbag 21 and is coupled to the airbag 21. The inflator 16 is held by mounting brackets 17. The mounting brackets 17 are attached to an inner panel 2 of a roof-side rail portion RR in the vicinity of and above the center pillar CP with bolts 18. Therefore, the inflator 16 is mounted and fixed to the inner panel 2 in the vicinity of and above the center pillar CP by the mounting brackets 17 and the bolts 18. The inflator 16 is covered with a lower edge 5a of a roof head lining 5, and is mounted and fixed to the inner panel 2. In addition, the inner panel 2 is a member on the side of a body (vehicle body) 1 of the vehicle V.

Each mounting bracket 13 mounts and fixes each mounting portion 48 of the airbag 21 to the inner panel 2 by a mounting bolt 14. In addition, each mounting bolt 14 is fastened to a screw hole at which a nut or the like in the inner panel 2 is provided. The airbag cover 11, as shown in FIG. 1, includes a lower edge 4a of a front pillar garnish 4 arranged at the front pillar FP and a lower edge 5a of the roof head lining 5 arranged at the roof side rail RR.

Figure 2:
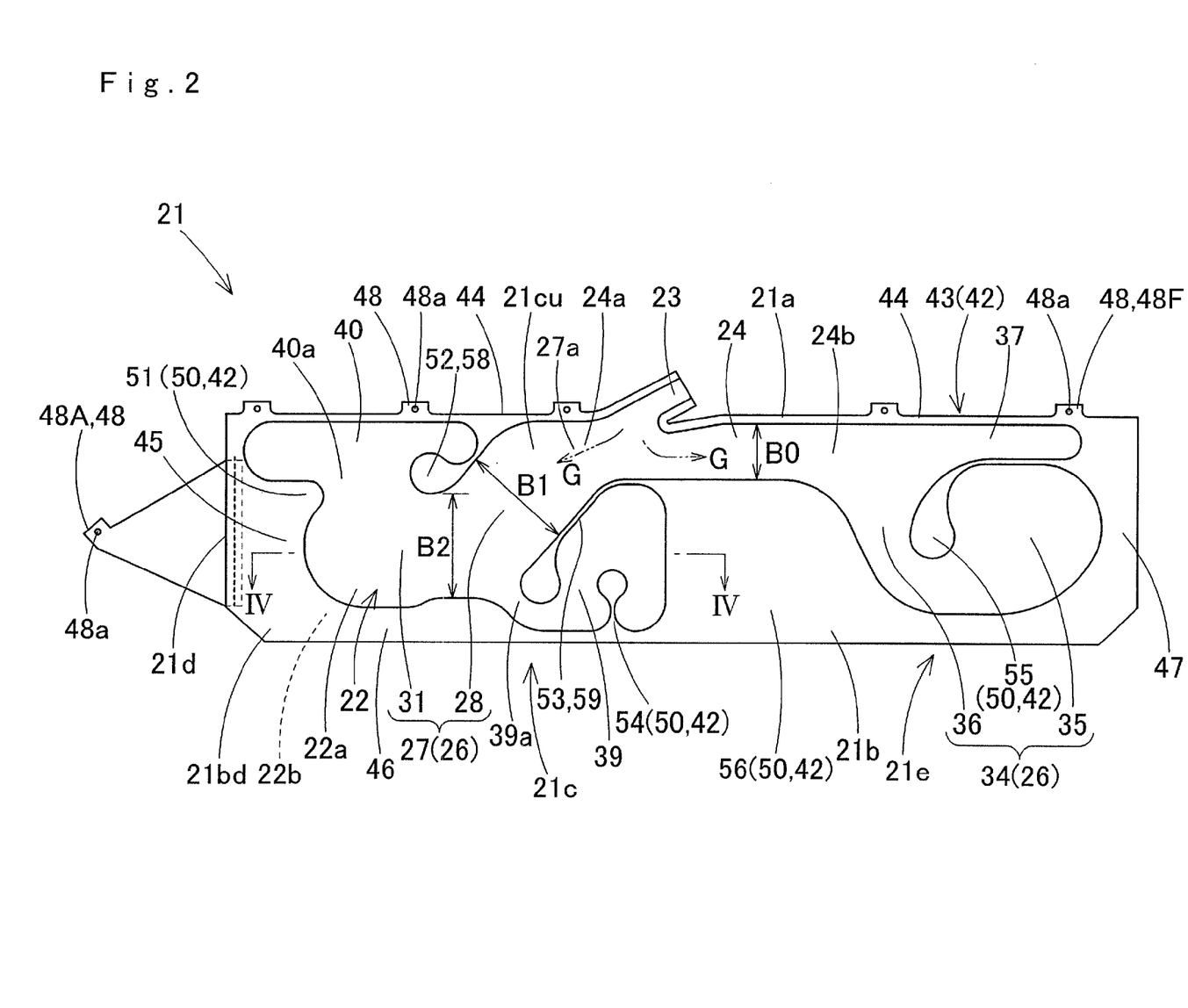
FIG. 2 is a view showing a state where an airbag to be used for the head-protecting airbag apparatus of the embodiment shown in FIG. 1 is flatly deployed.
Figure 3:
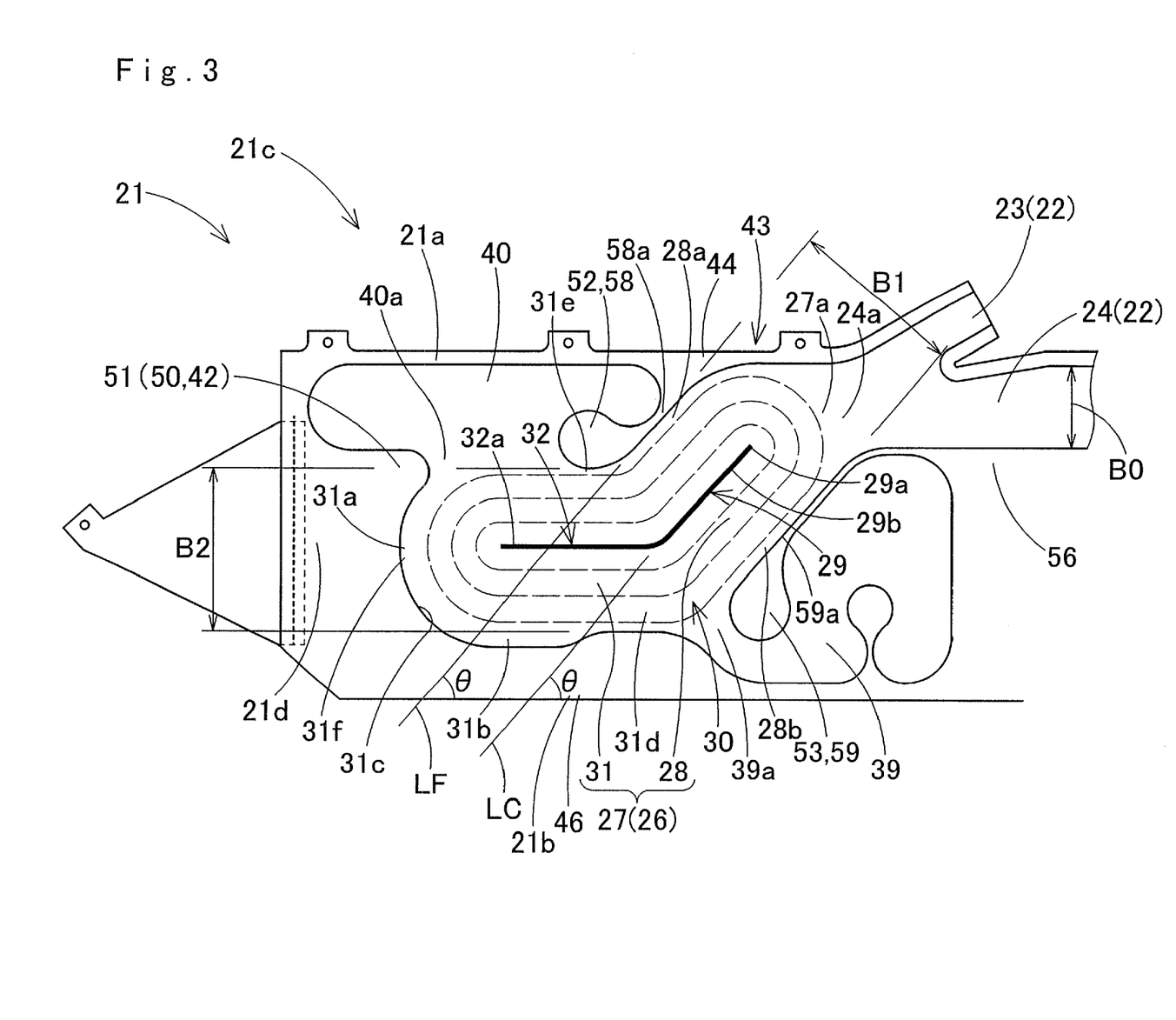
FIG. 3 is an enlarged front view of a front window shielding inflatable portion of the airbag of the embodiment, and a view with contour lines corresponding to protruding height to the interior in order to describe swelling thickness upon inflation.
Figure 4:
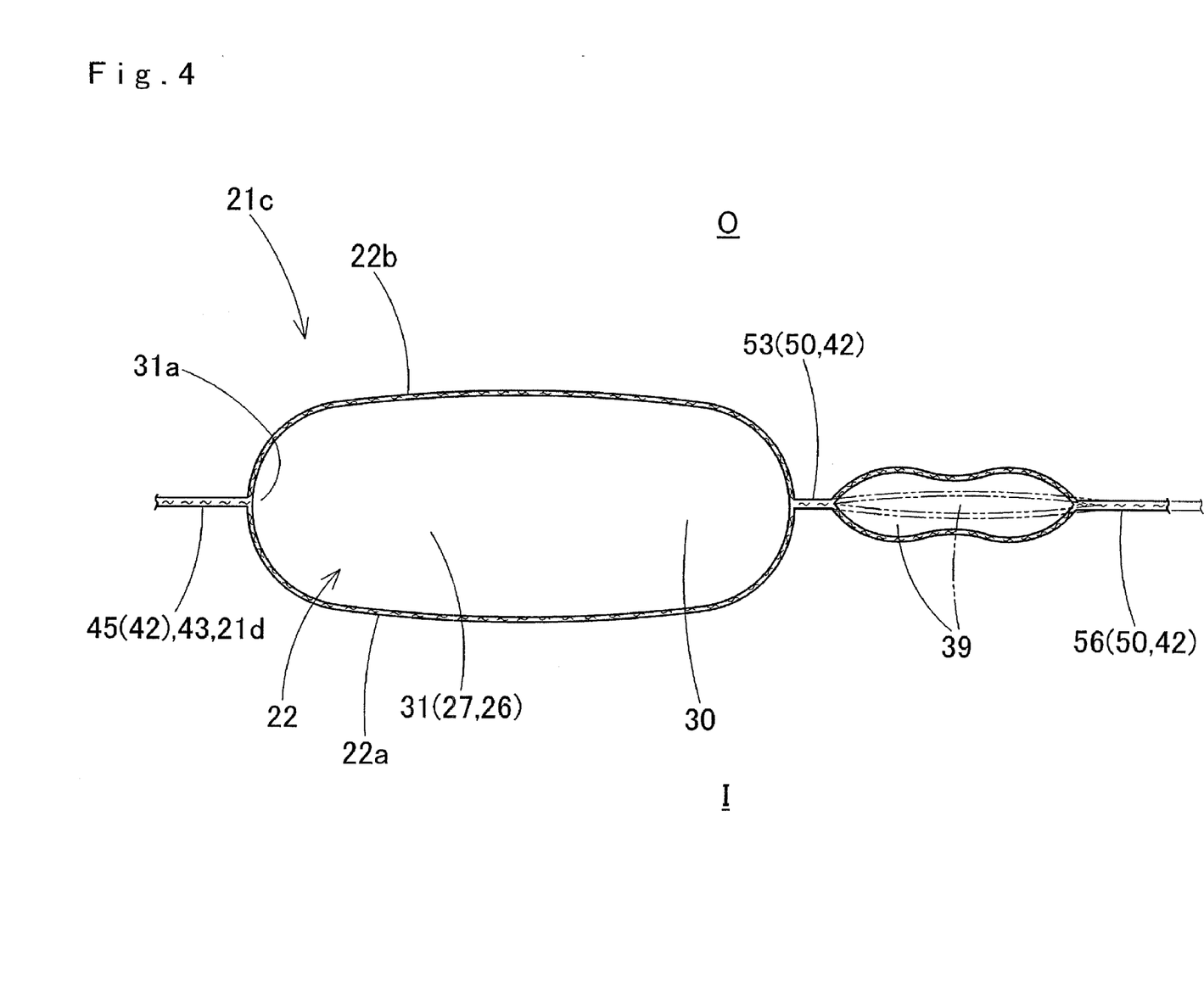
FIG. 4 is a cross-sectional view showing an inflation completion state of the airbag of the embodiment, and a view showing a state before the completion of inflation of a pressure-adjusting chamber by two-dot chain lines, and taken along the line IV-IV of FIG. 2.

As shown in FIGS. 1 to 5, when inflation gas G is allowed to flow in from the inflator 16, the airbag 21 is deployed from a folded state and inflates so as to cover the interiors I of the windows W1 and W2, the center pillar CP, and the rear pillar RP. As shown in FIGS. 2 to 4, the airbag 21 includes a gas inflow portion 22 and a gas non-inflow portion 42. The gas inflow portion 22 inflates so as to allow inflation gas G to flow thereinto and separate an interior wall portion 22a at the interior I and an exterior wall portion 22b at the exterior O (refer to FIG. 4). The gas non-inflow portion 42 inhibits inflation gas G from flowing thereinto in a state where the interior wall portion 22a and the exterior wall portion 22b are coupled together. The airbag 21 is manufactured by a hollow-weaving method using polyamide yarn, polyester yarn or the like, except the mounting portion 48 (48A) at the front end.

In case of the embodiment, the gas inflow portion 22 includes the joint port 23, the gas supply passage 24, a window shielding inflatable portion 26, a pressure-adjusting chamber 39, and a push-open inflatable portion 40. The joint port 23 extends upwards from a longitudinal intermediate portion at an upper edge 21a of the airbag 21. The joint port 23 is connected to an inflator 16 so that the inflation gas G from the inflator 16 is allowed to flow into the gas inflow portion 22. The gas supply passage 24 communicates with the joint port 23, and is disposed along the longitudinal direction, in the vicinity of the longitudinal center at the upper edge 21a of the airbag 21. The gas supply passage 24 is disposed between a front window shielding inflatable portion 27 and a rear window shielding inflatable portion 34 of the window shielding inflatable portion 26 so as to allow the front window shielding inflatable portion 27 and the rear window shielding inflatable portion 34 to communicate with each other.

The window shielding inflatable portion 26 includes the front window shielding inflatable portion 27 at a front portion 21c of the airbag 21 and the rear window shielding inflatable portion 34 at a rear portion 21e of the airbag. The front window shielding inflatable portion 27 covers the interiors of a window (front window) W1 at the front seat of the vehicle V and a portion of the center pillar CP, upon the completion of inflation. The rear window shielding inflatable portion 34 covers the interiors of a window (rear window) W2 at the rear seat and the rear pillar RP, upon the completion of inflation.

In addition, a flow regulating cloth (not shown) that is inserted up to the vicinity of a front end 24a of the gas supply passage 24 is disposed in the joint port 23. The flow regulating cloth branches the inflation gas G from the inflator 16 to both front and rear sides. That is, the inflation gas G of the inflator 16 is branched by the flow regulating cloth through the joint port 23. The inflation gas G that branches and flows to the front side flows into the front window shielding inflatable portion 27, and the inflation gas G that branches and flows to the rear side flows into the rear window shielding inflatable portion 34 through the gas supply passage 24. As a result, the front window shielding inflatable portion 27 and the rear window shielding inflatable portion 34 inflate, respectively.

The rear window shielding inflatable portion 34 includes a substantially oblong body inflatable portion 35 at a rear end lower portion, a front inflatable portion 36 disposed in the vertical direction at a front end, and an upper inflatable portion 37 at an upper portion. The upper inflatable portion 37 is disposed so as to extend rearward from the rear end 24b of the gas supply passage 24. Upon inflation, the upper inflatable portion 37 protects the head H of an occupant MB at the rear seat, and quickly pushes to open a portion 5ar above the rear pillar RP in the lower edge 5a of the roof head lining 5 as the airbag cover 11. The folded body inflatable portion 35 can be smoothly deployed to the interior of the rear pillar garnish 8 by the quick push-opening of this portion 5ar.

The front window shielding inflatable portion 27 has an inflow port 27a so as to inflow inflation gas G. The inflow port 27a is disposed at the front end 24a of the gas supply passage 24, that is, at a rear end upper portion of the front window shielding inflatable portion 27. In the region of the front window shielding inflatable portion 27, the gas non-flow portion 42 is not disposed, but only two inflatable portions of an inclining inflatable portion 28 and a horizontal inflatable portion 31 are disposed. The inclining inflatable portion 28 has a pipe shape that extends in an obliquely forward and downward direction from the inflow port 27a upon inflation. The horizontal inflatable portion 31 has a pipe shape that extends forward from a lower end of the inclining inflatable portion 28 upon inflation. Moreover, the horizontal inflatable portion 31 is adjacent to a lower edge 46 of a peripheral edge portion 43 (to be described below) at a lower edge 21b of the airbag 21, and extends forward from a lower end of the inclining inflatable portion 28 along the lower edge 21b of the airbag 21.

The front window shielding inflatable portion 27 inflates the pipe-shaped inclining inflatable portion 28 and the pipe-shaped horizontal inflatable portion 31 in a state where the gas non-flow portion 42 is not disposed in the region of the front window shielding inflatable portion, upon the completion of inflation. Therefore, in the front window shielding inflatable portion 27, an inclining peak portion 29 that extends in an obliquely forward and downward direction from the inflow port 27a and a horizontal peak portion 32 that extends forward from a lower end of the inclining peak portion 29, is disposed as a peak portion (apex portion) and a crest of which the thickness in the vehicle width direction upon the completion of inflation. The inclining peak portion 29 and the horizontal peak portion 32 are located in the vicinity of (on the centerline seen from the interior) the centers, in the width direction, of the inclining inflatable portion 28 and the horizontal inflatable portion 31 that are flatly deployed, and includes a ridgeline obtained by connecting portions that swell most thickly in the vehicle width direction. That is, the inclining peak portion 29 includes a swelled ridgeline of the inclining inflatable portion 28, and the horizontal peak portion 32 includes a swelled ridgeline of the horizontal inflatable portion 31.

Additionally, the respective width dimensions B1 and B2 of the inclining inflatable portion 28 and the horizontal inflatable portion 31 in a direction orthogonal to the respective inclining peak portion 29 and horizontal peak portion 32 that are flatly deployed are larger than the vertical width dimension B0 of the gas supply passage 24 that is flatly deployed. Moreover, in case of the embodiment, the width dimensions B1 and B2 of the inclining inflatable portion 28 and the horizontal inflatable portion 31 are made approximately equal to each other.

As shown in FIG. 3, the inclination angle 8 of the inclining peak portion 29 of the inclining inflatable portion 28 from the lower edge 21b that extends in the longitudinal direction of the airbag 21 that is flatly deployed is set to about 45° (50° in the embodiment). Moreover, a downward extension line LC of the inclining peak portion 29 of the inclining inflatable portion 28 in a state where the airbag 21 is flatly deployed intersects a lower edge 31b of the portion of the horizontal inflatable portion 31 that has shifted toward the rear side from a corner portion 31c of a front lower corner.

Figure 5:
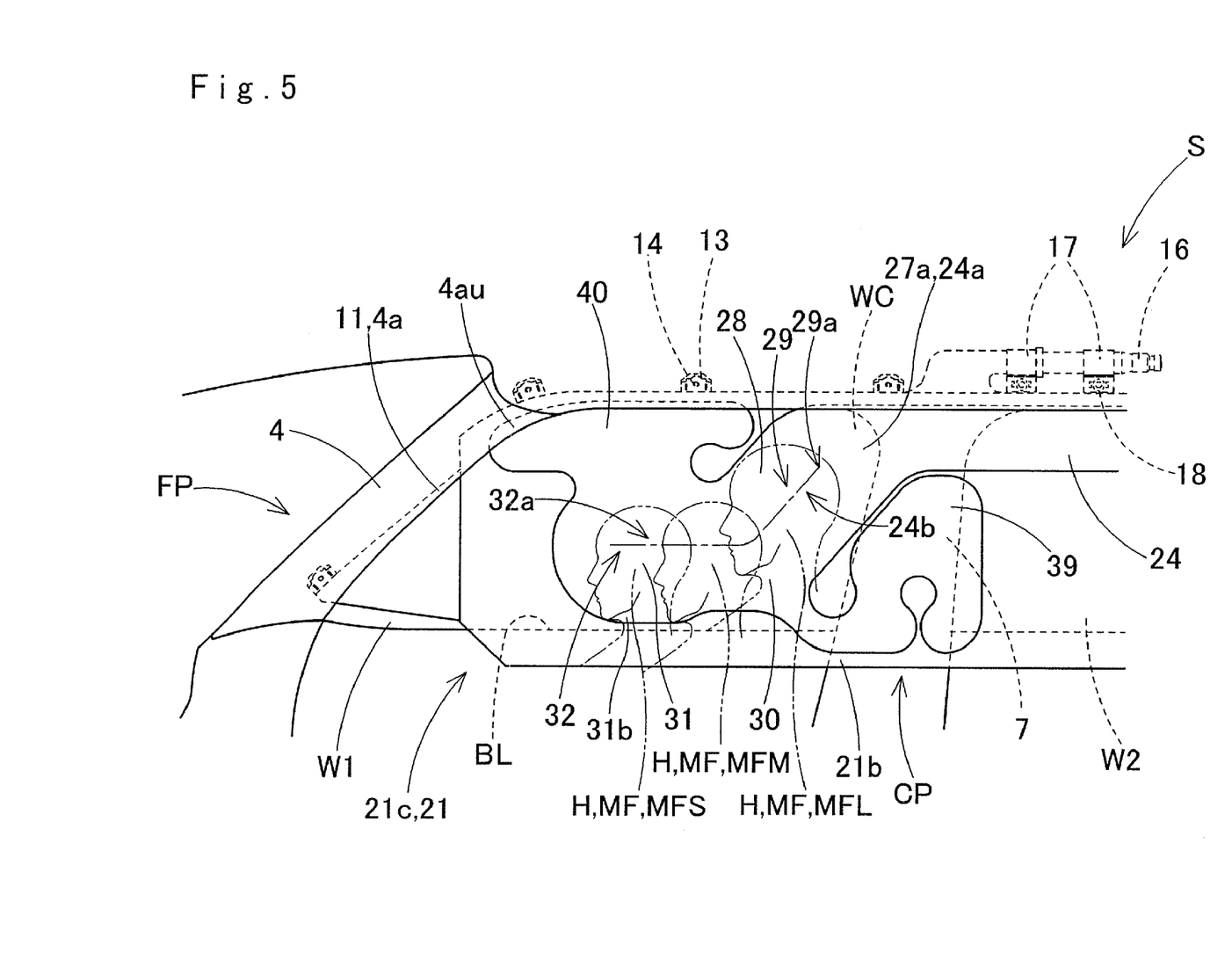
FIG. 5 is a front view at a front seat when the head protecting airbag apparatus of the embodiment shown in FIG. 1 is operated.

Additionally, an upper end 29a of the inclining peak portion 29 of the inclining inflatable portion 28 is arranged in the vicinity of a rear upper corner WC in a region of the window W1 at a side of the front seat upon the completion of inflation in the vehicle-mounted state of the airbag 21 (refer to FIG. 5).

Moreover, upon the completion of inflation in a vehicle-mounted state, the horizontal inflatable portion 31 is configured so that the lower edge 31b is arranged in the vicinity of the lower edge of the window W1 of the front seat, i.e., the height of a belt line BL.

Additionally, in case of the embodiment, the pressure-adjusting chamber 39 and the push-open inflatable portion 40 are disposed as other inflatable portions other than the front window shielding inflatable portion 27, at the front portion 21c of the airbag 21.

The pressure-adjusting chamber 39 is disposed in an area ranging from the lower side of the front end 24a of the gas supply passage 24 in the airbag 21 to the lower side of the inclining inflatable portion 28. In the pressure-adjusting chamber 39, a narrowed opening 39a is provided in the vicinity of an intersecting portion 30 with the inclining inflatable portion 28 at the lower edge 31b of a rear end 31d of the horizontal inflatable portion 31. The pressure-adjusting chamber 39 allows inflation gas G to flow thereinto via the opening 39a from the front window shielding inflatable portion 27, and inflates so that a rise in the internal pressure of the front window shielding inflatable portion 27 can be suppressed.

The push-open inflatable portion 40 is disposed above the horizontal inflatable portion 31 in the airbag 21. The push-open inflatable portion 40 is disposed so that a communication port 40a is disposed at the upper edge 31e of a front end 31f of the horizontal inflatable portion 31, and extends in the shape of a pipe in the longitudinal direction. The push-open inflatable portion 40 pushes an upper end 4au of the lower edge 4a of the front pillar garnish 4 as the airbag cover 11 by the inflow of inflation gas G from the communication port 40a. That is, since the push-open inflatable portion 40 pushes the upper end 4au open upon inflation, a front end portion of the airbag 21 housed at the exterior of the front pillar garnish 4 can be easily deployed.

In addition, the opening width of communication port 40a is set to be greater than the width dimension B0 of the gas supply passage 24, although the opening width is smaller than the width dimension B2 of the horizontal inflatable portion 31. Additionally, the opening width of the opening 39a of the pressure-adjusting chamber 39 is narrowed to be smaller than the width dimension B0 of the gas supply passage 24.

The gas non-flow portion 42 of the airbag 21 includes the peripheral edge portion 43, the mounting portion 48, and a closing portion 50. The peripheral edge portion 43 is arranged so as to surround the gas inflow portion 22.

A plurality of (six in the embodiment) the mounting portions 48 are formed so as to protrude upward from the peripheral edge portion 43 at the upper edge 21a of the airbag 21. Each mounting portion 48 is formed with a mounting hole 48a for allowing the mounting bolt 14 to be inserted therethrough. As already described, the mounting bracket 13 for attachment to the inner panel 2 at the body 1 is anchored to each mounting portion 48. Each mounting portion 48 is fixed to the inner panel 2 as the mounting bolt 14 inserted through each mounting hole 48a is fastened to each screw hole of the inner panel 2.

In addition, the mounting portion 48A of the front end, as already described, is formed as a separate cloth material formed from textiles, such as polyamide, is sewn at a portion formed by the hollow-weaving method of the airbag 21. Additionally, the mounting portion 48A is fixed to the vicinity of a lower portion of the front pillar FP, and exhibits a strong tension toward the lower edge 21b of the airbag 21 upon the completion of inflation of the airbag 21. In other words, the airbag 21 exhibits a strong tension on a line that connects a mounting portion 48A and a mounting portion 48 (48F) separated from the front pillar FP, upon the completion of inflation, to improve restraint performance toward the interior of occupants MF and MB in the airbag 21.

The closing portion 50 is disposed so as to partition an inflatable portion, includes a front closing portion 51, linear closing portions 52, 53, 54, and 55, and a plate-shaped closing portion 56.

The plate-shaped closing portion 56 partitions the front window shielding inflatable portion 27 and the rear window shielding inflatable portion 34 in a substantially oblong plate shape from a region at the lower edge 46 of the peripheral edge portion 43 to the gas supply passage 24.

The linear closing portion 55 partitions the upper inflatable portion 37 and the body inflatable portion 35 and partitions the front inflatable portion 36 and the body inflatable portion 35, in an L-shape that extends forward and goes down from a rear edge 47 of the peripheral edge portion 43.

The front closing portion 51 extends rearward from a front edge 45 of the peripheral edge portion 43 to constitute a front peripheral edge of the communication port 40a of the push-open inflatable portion 40. The front closing portion 51 partitions the horizontal inflatable portion 31 and the push-open inflatable portion 40.

The linear closing portion 52 extends obliquely forward and downward from the vicinity of the front of the gas supply passage 24 in the upper edge 44 of the peripheral edge portion 43, to constitute a rear peripheral edge of the communication port 40a of the push-open inflatable portion 40. The linear closing portion 52 partitions the push-open inflatable portion 40 and the front window shielding inflatable portion 27.

The linear closing portion 53 extends forward and goes down from an upper end of the plate-shaped closing portion 56, and partitions the inclining inflatable portion 28 and the pressure-adjusting chamber 39.

The linear closing portion 54 extends upward from the lower edge 46 side of the peripheral edge portion 43 so as to partition the inside of the pressure-adjusting chamber 39.

In addition, the linear closing portion 52 extends in an obliquely forward and downward direction continuously from the upper edge 44 of the peripheral edge portion 43 that partitions a region at the upper edge of the gas supply passage 24, and has a lower edge 58a partitioned from an upper edge 28a of the inclining inflatable portion 28. Therefore, the linear closing portion 52 constitutes an upper guide portion 58 for guiding the inflation gas G that flows in an obliquely forward and downward direction through the inclining inflatable portion 28.

Additionally, the linear closing portion 53 extends forward from the plate-shaped closing portion 56 so as to partition a region at the lower edge of the gas supply passage 24, and extends in an obliquely forward and downward direction from the vicinity of the front end 24a of the gas supply passage 24. That is, an upper edge 59a of the linear closing portion 53 extends obliquely forward and downward is partitioned from a lower edge 28b of the inclining inflatable portion 28. Therefore, the linear closing portion 53 constitutes a lower guide portion 59 for guiding the inflation gas G that flows in an obliquely forward and downward direction through the inclining inflatable portion 28.

The lower edge 58a of the upper guide portion 58 and the upper edge 59a of the lower guide portion 59 are substantially parallel to each other. Moreover, the lower edge 58a of the upper guide portion 58 is disposed so that a downward extension line LF intersects the vicinity of the corner portion 31c of the front lower corner in the horizontal inflatable portion 31. In addition, in case of the embodiment, the extension line LF intersects the lower edge 31b slightly behind the corner portion 31c in the horizontal inflatable portion 31. Additionally, similarly to the inclining peak portion 29, the inclination angle 8 of the lower edge 58a of the upper guide portion 58 or the upper edge 59a of the lower guide portion 59 from the lower edge 21b of the airbag 21 is also set to about 45° (in case of the embodiment, 50°). The lower edge 21b of the airbag 21 is arranged along the horizontal direction in the longitudinal direction.

As for mounting of the head protecting airbag apparatus S of the embodiment onto the vehicle V, the airbag 21 is first folded. Upon this folding, a region at the lower edge 21b of the airbag 21 that is flatly deployed is folded so as to approach a region at the upper edge 21a in which the mounting portion 48 is provided. Subsequently, the airbag 21 is wound by a breakable wrapping material (not shown) for preventing collapse of folding. In addition, the airbag 21 is formed by folding the area of the upper edge 21a of the airbag 21 including the gas supply passage 24 into a bellows shape, and rolling the area therebelow.

Then, after the airbag 21 is folded, the inflator 16 on which the mounting brackets 17 are mounted is connected to the joint port 23 of the airbag 21, and the mounting brackets 13 are respectively attached to the mounting portions 48 of the airbag 21, thereby forming an airbag assembly.

Thereafter, the respective mounting portions 48 are fixed to the inner panel 2 by arranging the respective mounting portions 48 to which the mounting brackets 13 are assembled at corresponding mounting portions of the inner panel 2 at the body 1, and fastening the mounting bolts 14 into the screw holes like inserting each mounting portion through each mounting hole 48a. Additionally, the airbag assembly is mounted on the body 1 by stopping the mounting brackets 17 on the inner panel with the bolts 18, and fixing the inflator 16 to the inner panel 2. Then, if a lead wire (not shown) that extends from a control device for a predetermined operation of the inflator is connected to the inflator 16, the front pillar garnish 4 and the roof head lining 5 are mounted on the body 1, and the center pillar garnish 7 and the rear pillar garnish 8 are mounted on the body 1, the head-protecting airbag apparatus S can be mounted on the vehicle V.

If the inflator 16 is operated after the head-protecting airbag apparatus S of the embodiment is mounted on the vehicle V, as indicated by two-dot chain lines of FIG. 2, the inflation gas G from the inflator 16 flows into the gas supply passage 24 from the joint port 23 in the airbag 21, flows into the front window shielding inflatable portion 27 and the rear window shielding inflatable portion 34 of the airbag 21, and also flows into the push-open inflatable portion 40. Therefore, the airbag 21 breaks the covered wrapping material (not shown), and pushes to open the airbag cover 11 at the lower edges 4a and 5a of the front pillar garnish 4 and the roof head lining 5 to deploy and inflate greatly so as to cover the interior I of the windows W1 and W2, the center pillar CP, and the rear pillar RP as indicated by two-dot chain lines of FIG. 1 and FIG. 5 while protruding downward.

Then, in the head protecting airbag apparatus S of the embodiment, if the inflation gas G from the inflator 16 flows into the airbag 21, the inflation gas G flow into the respective window shielding inflatable portions 26 through the gas supply passage 24. In that case, in the front window shielding inflatable portion 27, inflation gas G flows into the inclining inflatable portion 28 from the inflow port 27a of the front end 24a of the gas supply passage 24, flows into the horizontal inflatable portion 31 from the inclining inflatable portion 28, and reaches the front edge 31a of the horizontal inflatable portion 31.

The front window shielding inflatable portion 27 includes the inclining inflatable portion 28 and the horizontal inflatable portion 31 that communicate with each other, and the gas non-flow portion 42 that is disposed to separate from the periphery is not disposed in the region of the front window shielding inflatable portion 27. The inclining inflatable portion 28 is formed between the lower edge 58a of the upper guide portion 58, and the upper edge 59a of the lower guide portion 59. Therefore, in the inclining inflatable portion 28, the inflation gas G that flows in so as to be directed forward from the gas supply passage 24 can be received at the lower edge 58a of the upper guide portion 58 that continues from the upper edge of the gas supply passage 24, and can be allowed to flow to the horizontal inflatable portion 31 between the upper guide portion 58 and the lower guide portion 59 while being smoothly changed obliquely downward.

That is, in the airbag 21, the inflation gas G supplied from the gas supply passage 24 flows with a reduction in flow velocity being extremely suppressed without being branched vertically, at portions, such as the closing portion 50 of the gas non-flow portion 42, and in the front portion 21c, flows from a rear upper edge 21cu to an obliquely downward front lower edge 21db (refer to FIG. 2), so that the lower edge 21b of the airbag 21 including the region at the front edge 21d can be deployed. As a result, the whole region of the airbag 21 at the front portion 21c can be rapidly deployed.

Moreover, if the inflation of the inclining inflatable portion 28 itself is completed, the inclining peak portion 29 that is located on the centerline of the inclining inflatable portion 28 seen from the interior, and swells more thickly in the vehicle width direction than the gas supply passage 24 can be formed immediately. Therefore, in the airbag 21, the head H of an occupant MF (MFL) at the front seat can be received with sufficient cushioning properties by the inclining peak portion 29. Of course, upon the completion of inflation of the inclining inflatable portion 28, the horizontal inflatable portion 31 also inflates, and the horizontal peak portion 32 that swells more thickly than the gas supply passage 24 is formed similarly to the inclining peak portion 29. Therefore, in the airbag 21, the heads H of the occupants MF (MFS, MFL) at the front seat can be received with sufficient cushioning properties even by the horizontal peak portion 32 (refer to FIG. 5).

The head H of a big-bodied occupant MFL is apt to be disposed at the upper portion and rear portion of the front window shielding inflatable portion 27. In that case, in the airbag 21 of the head protecting airbag apparatus S of the embodiment, it is possible to receive the head H of the big-bodied occupant MFL with sufficient cushioning properties by the inclining peak portion 29 of the inclining inflatable portion 28.

Additionally, the head H of a small-bodied occupant MFS is apt to be arranged at the lower portion of the front window shielding inflatable portion 27. In that case, in the airbag 21 of the head protecting airbag apparatus S of the embodiment, it is possible to receive the head H of the small-bodied occupant MFL with sufficient cushioning properties by the horizontal peak portion 32 of the horizontal inflatable portion 31.

Accordingly, in the head protecting airbag apparatus S of the embodiment, the airbag 21 can quickly perform deployment and inflation to the lower edge of the front window shielding inflatable portion 27, and suitably receive and protect the heads H of occupants MF that have different physiques.

Additionally, in the embodiment, the airbag 21 is configured so that, upon the completion of inflation, the upper end 29a of the inclining peak portion 29 of the inclining inflatable portion 28 is arranged in the vicinity of the rear upper corner WC in the region of the window W1 of a side of the front seat and the lower edge 31b of the horizontal inflatable portion 31 is arranged in the vicinity of the height of the belt line BL of the lower edge of the window W1 of the front seat.

Therefore, in the embodiment, when the big-bodied occupant MFL makes a front seat slide back and sits down with his/her head H arranged in the vicinity of the center pillar CP on the rear side of the window W1, the head H of the big-bodied occupant MFL can be suitably received by a region at the upper portion 29b of the inclining peak portion 29 of the inclining inflatable portion 28 where the airbag 21 has swelled thickly. Additionally, in the embodiment, when the small-bodied occupant MFS makes a front seat slide forward and sits down with his/her head H arranged in the vicinity of the belt line BL that becomes the vicinity of the lower edge of the window W1, the head H of the small-bodied occupant MFS can be suitably received by a region at the front portion 32a of the horizontal peak portion 32 of the horizontal inflatable portion 31 where the airbag 21 has swelled thickly.

In addition, in the illustrated example, the lower edge 31b of the horizontal inflatable portion 31 upon the completion of inflation is slightly higher than the belt line BL. However, with the interior below the window W1 covered, the horizontal inflatable portion 31 may be arranged so that the lower edge 31b is located at a height position below the belt line BL in the vicinity of belt line BL.

Moreover, in the embodiment, the respective width dimensions B1 and B2 of the inclining inflatable portion 28 and the horizontal inflatable portion 31 in the airbag 21 that are flatly deployed are made approximately to each other. Additionally, the inclining inflatable portion 28 of the airbag 21 is arranged so that, with the airbag being flatly deployed, the inclination angle θ of the inclining peak portion 29 with the lower edge 21b that extends in the longitudinal direction of the airbag 21 is set to about 45° (in detail, 50°) and the downward extension line LF of the lower edge 58a of the upper guide portion 58 intersects the vicinity of the corner portion 31c of the front lower corner in the horizontal inflatable portion 31.

Therefore, in the embodiment, the inclining inflatable portion 28 can make the inflation gas G directed forward from the gas supply passage 24 flow in an obliquely downward direction of about 45° and linearly toward the vicinity of the corner portion 31c of the front lower corner of the horizontal inflatable portion 31, at the upper edge 28a partitioned by the upper guide portion 58. As a result, at the front portion 21c of the airbag 21, the whole region at the lower edge 21b can deploy and simultaneously can swell to the front edge 21d upon the inflow of inflation gas G. That is, deployment and inflation of the front window shielding inflatable portion 27 can be performed as rapidly as possible.

Additionally, the inclining inflatable portion 28 and the horizontal inflatable portion 31 are made thicker than the gas supply passage 24, and swell in the shape of a pipe with almost the same diameter, and the vicinity of the intersecting portion 30 between the horizontal peak portion 32 and the inclining peak portion 29 is arranged in the vicinity of a longitudinal intermediate portion of the front window shielding inflatable portion 27. Even if the head H of an occupant shifts to the front side or shifts to the upper side in the vicinity of the intersecting portion 30, the head can be smoothly received by any of the horizontal peak portion 32 and the inclining peak portion 29. As a result, the front window shielding inflatable portion 27 upon the completion of inflation can suitably receive the head H of an average middle-bodied occupant MFM over a wide range in the vicinity of the intersecting portion 30.

In addition, about 45° in the inclination angle 8 of the downward extension line LC or LF of the inclining peak portion 29 or the lower edge 58a of the upper guide portion 58 may not be strictly only 45° if deployment and inflation at the lower edge and front edge at the front portion 21c of the airbag 21 can be smoothly performed. That is, the inclination angle θ indicates a range of 15 to 75° that becomes ±30°, preferably, 35 to 55 degrees of ±10°, and more preferably 40 to 50° of ±5°, as a range where the action capable of smoothly performing deployment and inflation at the front portion 21c of the airbag 21 is not hindered.

Moreover, in the embodiment, the pressure-adjusting chamber 39 that can suppress a rise in the internal pressure of the front window shielding inflatable portion 27 is disposed in an area ranging from the lower side of the front end 24a of the gas supply passage 24 in the airbag 21 to the lower side of the inclining inflatable portion 28. In the pressure-adjusting chamber 39, the narrowed opening 39a is disposed in the vicinity of the intersecting portion 30 with the inclining inflatable portion 28 at the lower edge 31b of the rear end 31d of the horizontal inflatable portion 31. The pressure-adjusting chamber 39 allows inflation gas G to flow thereinto via the opening 39a from the front window shielding inflatable portion 27, and inflates.

Therefore, in the embodiment, when the inflated front window shielding inflatable portion 27 receives the head H of an occupant MF and raises the internal pressure abruptly, the inflation gas G flows to the pressure-adjusting chamber 39 via the opening 39a. As a result, even if the internal pressure is to be abruptly raised, the front window shielding inflatable portion 27 can reduce the value of the internal pressure, and can receive and protect the head of the occupant H with sufficient cushioning properties.

Additionally, in the pressure-adjusting chamber 39, the opening 39a that allows inflation gas G to flow thereinto is arranged in the vicinity of the intersecting portion 30 with the inclining inflatable portion 28 at the lower edge 31b of the rear end 31d of the horizontal inflatable portion 31. Therefore, since the inflation gas G is apt to flow toward the front end 31f of the horizontal inflatable portion 31 in the vicinity of the intersecting portion 30 in an early stage of inflation of the airbag 21, the inflation gas is hard to flow into the pressure-adjusting chamber 39 via the opening 39a. As a result, in the middle of inflation of the airbag 21, the inflation gas G is hard to flow to the pressure-adjusting chamber 39, and does not hinder the rapid completion of inflation of the front window shielding inflatable portion 27.

Moreover, in the embodiment, the push-open inflatable portion 40 is disposed above the horizontal inflatable portion 31 in the airbag 21. The push-open inflatable portion 40 is disposed so that the communication port 40a communicating with the horizontal inflatable portion 31 is disposed at the upper edge 31e of the front end 31f of the horizontal inflatable portion 31. The push-open inflatable portion 40 pushes the upper end 4au of the front pillar garnish 4 to be opened by the inflow of inflation gas G, to facilitate the deployment of the front end portion of the airbag 21 housed at the exterior of the front pillar garnish 4.

That is, in the embodiment, when inflation gas G is made to flow in and the front window shielding inflatable portion 27 inflates, the push-open inflatable portion 40 allows the inflation gas G to flow thereinto from communication port 40a, inflates, and pushes the front pillar garnish 4 to be opened. Therefore, the front end portion of the airbag 21 can deploy smoothly downward from the front pillar FP that is a housing portion.

In addition, in the airbag 21 of the embodiment, the pressure-adjusting chamber 39 and the push-open inflatable portion 40 are disposed in addition to the front window shielding inflatable portion 27 having the inclining inflatable portion 28 and the horizontal inflatable portion 31, as a front inflatable portion at the front portion 21c. Therefore, if the pressure-adjusting chamber 39 and the push-open inflatable portion 40 inflate, the head H of an occupant MF can be received even by these portions. As a result, in the airbag 21 of the embodiment, the head H of an occupant MF at a front seat can be protected in a wide range by the front inflatable portion including the front window shielding inflatable portion 27, the pressure-adjusting chamber 39, and the push-open inflatable portion 40.

Figure 6:
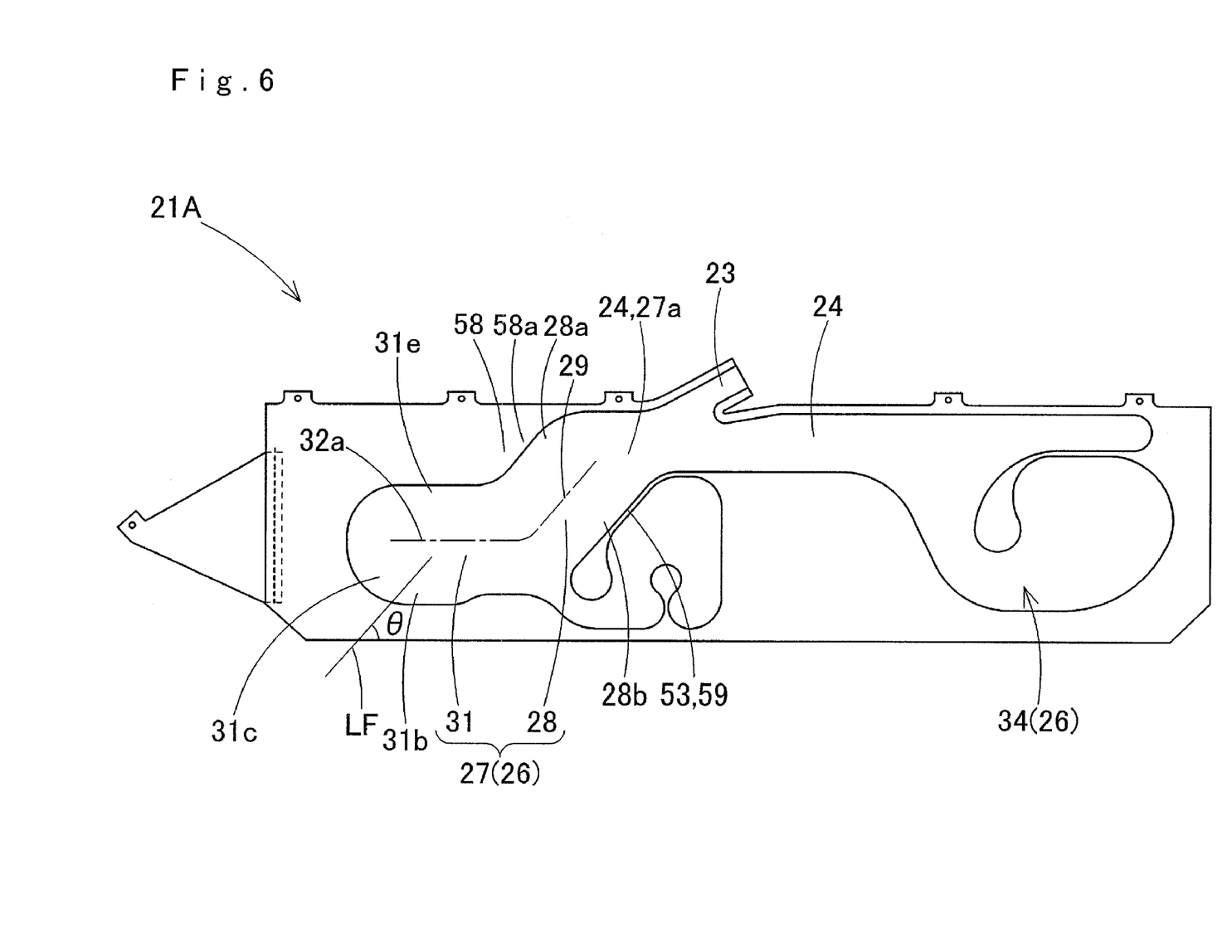
FIG. 6 is a view showing a state where an airbag to be used for a modification of the embodiment is flatly deployed.
Figure 7:
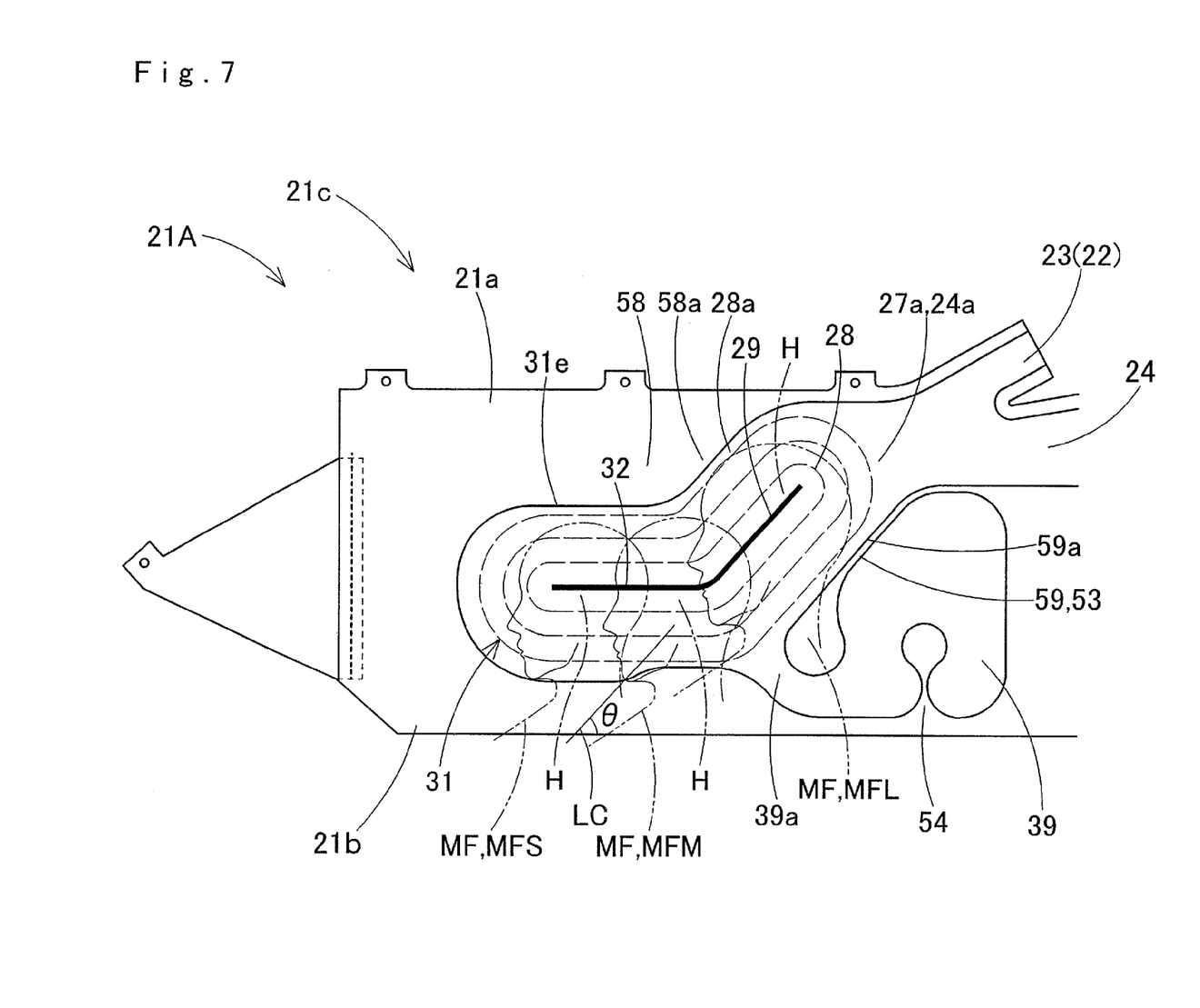
FIG. 7 is an enlarged front view of a front window shielding inflatable portion of the airbag shown in FIG. 6, and a view with contour lines corresponding to protruding height to the interior in order to describe swelling thickness upon inflation.

Additionally, if the front pillar garnish can be smoothly pushed open, the front window shielding inflatable portion 27 and the pressure-adjusting chamber 39 may be disposed at the front portion 21c, as in an airbag 21A shown in FIGS. 6 and 7. The front window shielding inflatable portion 27 of the airbag 21A includes the same inclining inflatable portion 28 and the horizontal inflatable portion 31 as the front window shielding inflatable portion 27 of the airbag 21 of the embodiment. Moreover, the pressure-adjusting chamber 39 of the airbag 21A is configured similarly to the pressure-adjusting chamber 39 of the airbag 21 of the embodiment. Therefore, the airbag 21A can obtain the same functions and effects as the embodiment except that there is no function of the push-open inflatable portion 40.

In addition, in the airbag 21A, the lower edge 58a of the upper guide portion 58 partitions the upper edge 28a of the inclining inflatable portion 28, and extends to the front side along the longitudinal direction from the lower end so as to partition the upper edge 31 e of the horizontal inflatable portion 31.

Moreover, in the airbag 21 of the embodiment, it is shown that the pressure-adjusting chamber 39 is provided at the front portion 21c. However, in the airbag of the invention, the pressure-adjusting chamber may be arranged at the rear portion of the airbag that is a portion other than the front portion of the airbag. Moreover, the pressure-adjusting chamber may be eliminated.

Moreover, in the airbag 21 of the embodiment, the window shielding inflatable portion including two portions, i.e., the front window shielding inflatable portion 27 and the rear window shielding inflatable portion 34 is shown. However, as the airbag of the invention, three or more window shielding inflatable portions may be disposed so as to cope with a vehicle of three-row seats or the like.

What is claimed is:

1. A head protecting airbag apparatus comprising:
an airbag that is configured to deploy and inflate downward from a region at an upper edge of a window of a vehicle so as to cover the interior of the window upon the inflow of inflation gas in order to protect the head of an occupant, and is folded and housed at the upper edge of the window so that a lower edge of the airbag in a flatly deployed state approaches an upper edge thereof,
an inflator that supplies inflation gas to the airbag,
wherein the vehicle includes a plurality of windows juxtaposed in a longitudinal direction, including a front window at a side of a front seat,
wherein the airbag includes:
a gas inflow portion that swells so as to allow inflation gas to flow thereinto and separate an interior wall portion and an exterior wall portion; and
a gas non-inflow portion that is configured to couple the interior wall portion and the exterior wall portion together, and inhibits inflation gas from flowing thereinto, and that has a peripheral edge portion surrounding the gas inflow portion.
wherein the gas inflow portion includes:
a plurality of window shielding inflatable portions that deploys and inflates so as to cover a plurality of windows juxtaposed in the longitudinal direction, and includes a front window shielding inflatable portion that covers the front window; and
a gas supply passage that is arranged along the longitudinal direction at the upper edge of the airbag, allows a front end thereof to communicate with the front window shielding inflatable portion, and supplies the inflation gas from the inflator to the front window shielding inflatable portion,
wherein the front window shielding inflatable portion is disposed at a rear end upper portion thereof an inflow port that communicates with a front end of the gas supply passage to allow inflation gas to flow thereinto from the gas supply passage, and is configured so that the gas non-flow portion is not disposed in the region of the front window shielding inflatable portion, and
wherein the front window shielding inflatable portion is configured by disposing:

an inclining inflatable portion that inflates in the shape of a pipe so as to extend in an obliquely forward and downward direction from the inflow port upon the completion of inflation, and inflates so that an inclining peak portion that extends in an obliquely forward and downward direction from the inflow port is disposed as a peak portion of which the thickness in a vehicle width direction is made large; and a horizontal inflatable portion that inflates in the shape of a pipe that extends forward along the lower edge of the airbag while being adjacent to a lower edge portion of the peripheral edge portion in the lower edge of the airbag from a lower end of the inclining inflatable portion upon the completion of inflation, and inflates so that the horizontal peak portion that extends forward from a lower end of the inclining peak portion is disposed as a peak portion of which the thickness in the vehicle width direction is made large wherein the gas non-flow portion includes:

an upper guide portion that is arranged at an upper edge of the inclining inflatable portion, and extends in an obliquely forward and downward direction continuously from the portion of the gas non-flow portion that partitions a region at an upper edge of the gas supply passage; and a lower guide portion is arranged at a lower edge of the inclining inflatable portion, and extends in an obliquely forward and downward direction from the portion of the gas non-flow portion that partitions a region at a lower edge of the gas supply passage, and wherein the inclining inflatable portion is disposed between the upper guide portion and the lower guide portion, and the respective width dimensions of the inclining inflatable portion and the horizontal inflatable portion in a direction orthogonal to the respective inclining peak portion and horizontal peak portion that are flatly deployed are larger than the vertical width dimension of the gas supply passage that is flatly deployed.

2. The head protecting airbag apparatus according to claim 1, wherein the airbag is configured so that, upon the completion of inflation, an upper end of the inclining peak portion of the inclining inflatable portion is arranged in the vicinity of a rear upper corner in the region of the front window, and a lower edge of the horizontal inflatable portion is arranged in the vicinity of the height of the lower edge of the window at the front seat.

3. The head protecting airbag apparatus according to claim 1, wherein the respective width dimensions of the inclining inflatable portion and the horizontal inflatable portion in a direction orthogonal to the respective inclining peak portion and horizontal peak portion that are flatly deployed are made approximately equal to each other, and the inclining inflatable portion of the airbag is arranged so that, with the airbag being flatly deployed, the inclination angle of the inclining peak portion with the lower edge that extends in the longitudinal direction of the airbag is set to about 45°, and the downward extension line of the lower edge of the upper guide portion intersects the vicinity of the corner portion of the front lower corner in the horizontal inflatable portion.

4. The head protecting airbag apparatus according to claim 1, wherein the gas inflow portion of the airbag includes a pressure-adjusting chamber capable of being inflated by allowing inflation gas to flow thereinto from the front window shielding inflatable portion so as to be able to suppress a rise in the internal pressure of the front window shielding inflatable portion, and the pressure-adjusting chamber is configured so that a narrowed opening for allowing inflation gas to flow thereinto from the front window shielding inflatable portion is arranged in the vicinity of the intersecting portion with the inclining inflatable portion at the lower edge of the rear end of the horizontal inflatable portion, and is disposed in an area ranging from the lower side of the front end of the gas supply passage in the airbag to the lower side of the inclining inflatable portion.

5. The head protecting airbag apparatus according to claim 1, wherein the vehicle includes a front pillar in front of the front window and a garnish that covers the interior of the front pillar, wherein a front end portion of the airbag is configured to be housed at the exterior of the garnish, wherein the gas inflow portion of the airbag includes a push-open inflatable portion that is located above the horizontal inflatable portion, has a communication port, which communicates with the horizontal inflatable portion to allow inflation gas to flow thereinto from the horizontal inflatable portion, disposed at the upper edge of the front end of the horizontal inflatable portion, and is configured to push the garnish to be opened by the inflow of inflation gas from the horizontal inflatable portion that has passed through the communication port.

* * * * *